(12) United States Patent
Kohigashi et al.

(10) Patent No.: US 11,171,540 B2
(45) Date of Patent: Nov. 9, 2021

(54) DRIVING DEVICE, COMPONENT SET, AND ASSEMBLY METHOD

(71) Applicant: HONDA MOTOR CO., LTD., Tokyo (JP)

(72) Inventors: Kenta Kohigashi, Wako (JP); Tsuyoshi Yoshigasaki, Wako (JP); Naoki Matsunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 13 days.

(21) Appl. No.: 16/210,459

(22) Filed: Dec. 5, 2018

(65) Prior Publication Data

US 2019/0207469 A1   Jul. 4, 2019

(30) Foreign Application Priority Data

Dec. 28, 2017   (JP) .............................. JP2017-254258

(51) Int. Cl.

| H02K 15/00 | (2006.01) |
|---|---|
| H02K 7/116 | (2006.01) |
| F16H 1/20 | (2006.01) |
| F16H 57/033 | (2012.01) |
| F16H 57/02 | (2012.01) |

(52) U.S. Cl.
CPC .............. H02K 7/116 (2013.01); F16H 1/20 (2013.01); F16H 57/033 (2013.01); H02K 15/0006 (2013.01); *F16H 2057/02034* (2013.01)

(58) Field of Classification Search
CPC ........ H02K 7/10; H02K 7/116; H02K 7/1163; H02K 7/1166; F16H 57/033; F16H 1/20; F16H 2057/02034

USPC ....................................................... 310/83, 99
See application file for complete search history.

(56) References Cited

U.S. PATENT DOCUMENTS

| 5,220,852 A | 6/1993 | Shinoda et al. |
|---|---|---|
| 2011/0094806 A1* | 4/2011 | Mack .................... F16H 37/082 180/65.6 |
| 2014/0319948 A1* | 10/2014 | Nagase ................. H02K 5/145 310/83 |

FOREIGN PATENT DOCUMENTS

| BE | 779533 A | 6/1972 |
|---|---|---|
| DE | 2403504 A1 | 7/1975 |
| EP | 0648317 A1 | 4/1995 |
| EP | 0695889 A1 | 2/1996 |
| JP | 2016-195484 A | 11/2016 |

(Continued)

OTHER PUBLICATIONS

Machine Translation, Watanabe, JP-2016223554-A, Dec. 2016. (Year: 2016).*

(Continued)

*Primary Examiner* — Thomas Truong
(74) *Attorney, Agent, or Firm* — Thomas | Horstemeyer, LLP

(57) ABSTRACT

A driving device includes a motor unit including a motor, and a speed reducer attached to the motor unit. The speed reducer includes a plurality of gears combined to decelerate an output of the motor, and a gear case configured to support the plurality of gears and attached to the motor unit. The gear case is selected from a plurality of types of gear cases. The plurality of types of gear cases are different from one another in an arrangement of the plurality of gears and a position of an output shaft relative to an input shaft.

5 Claims, 5 Drawing Sheets

(56) References Cited

FOREIGN PATENT DOCUMENTS

JP        2016223554 A   * 12/2016

OTHER PUBLICATIONS

European Search Report issued for European Patent Application No. 18211488.4 dated Apr. 23, 2019.
European Office Action issued for European Patent Application No. 18211488.4 dated Feb. 11, 2020.

* cited by examiner

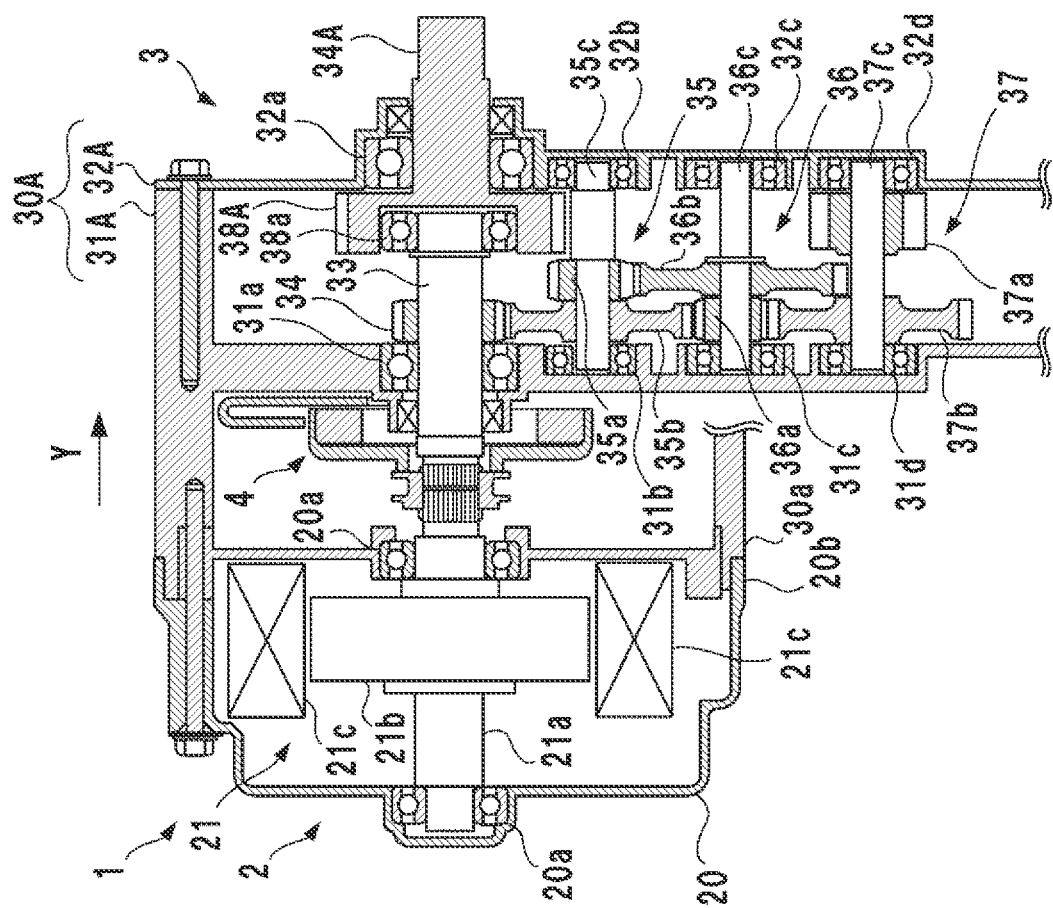
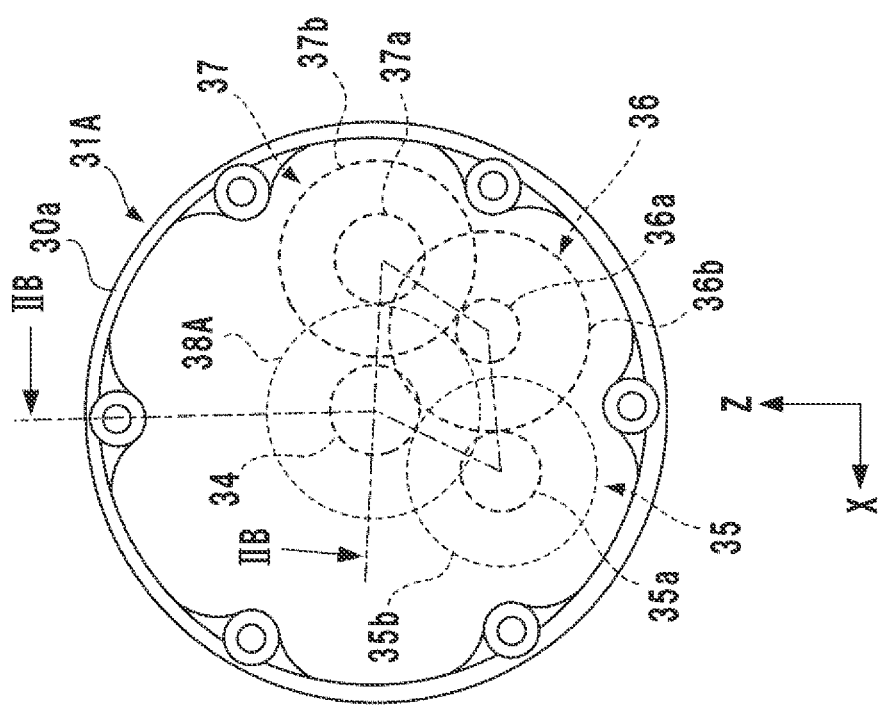
FIG. 2B
FIG. 2A

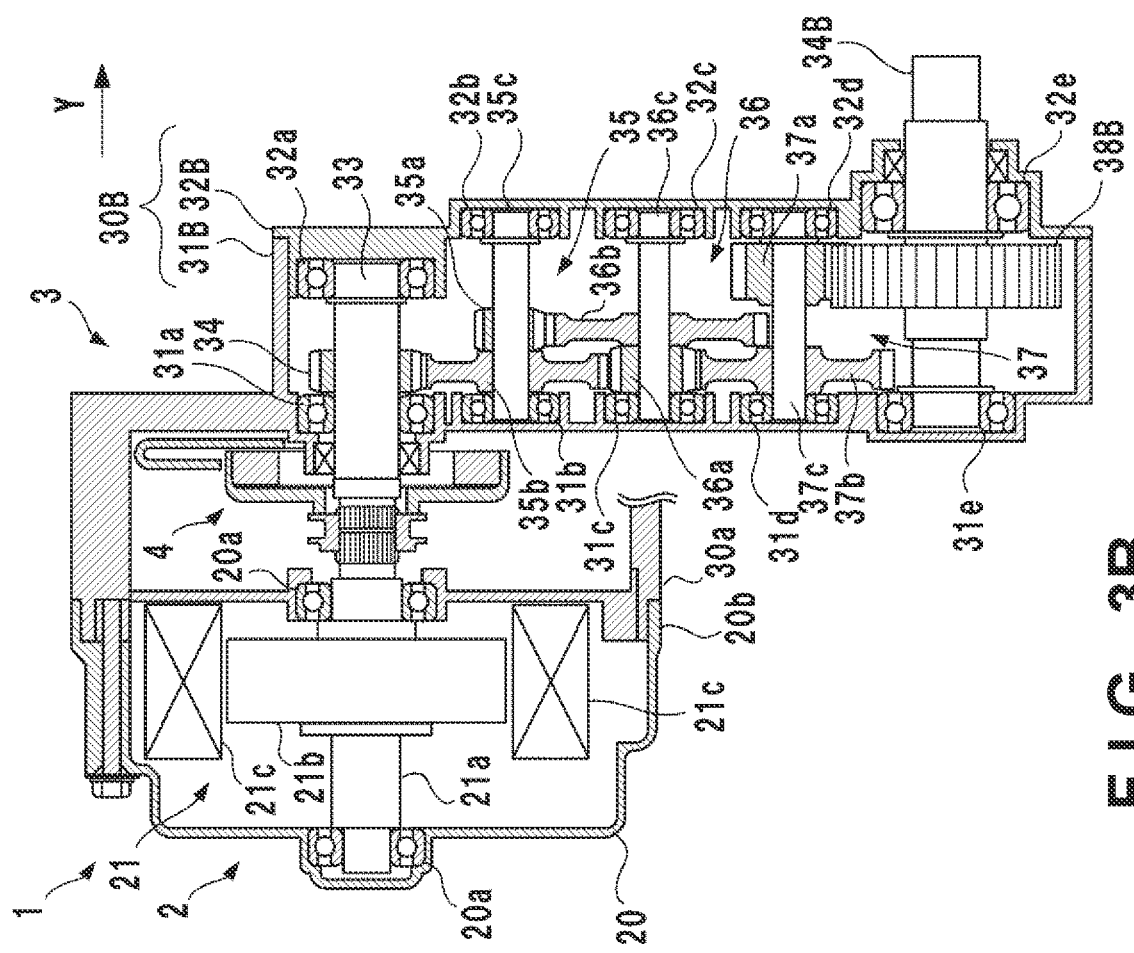
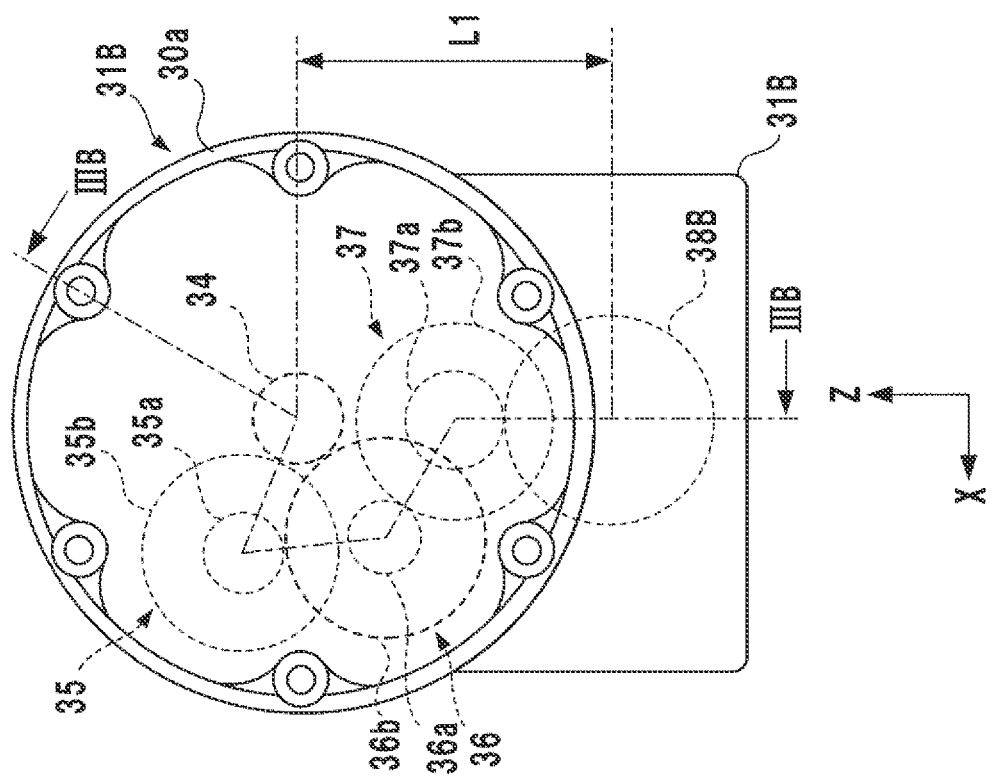
FIG. 3B
FIG. 3A

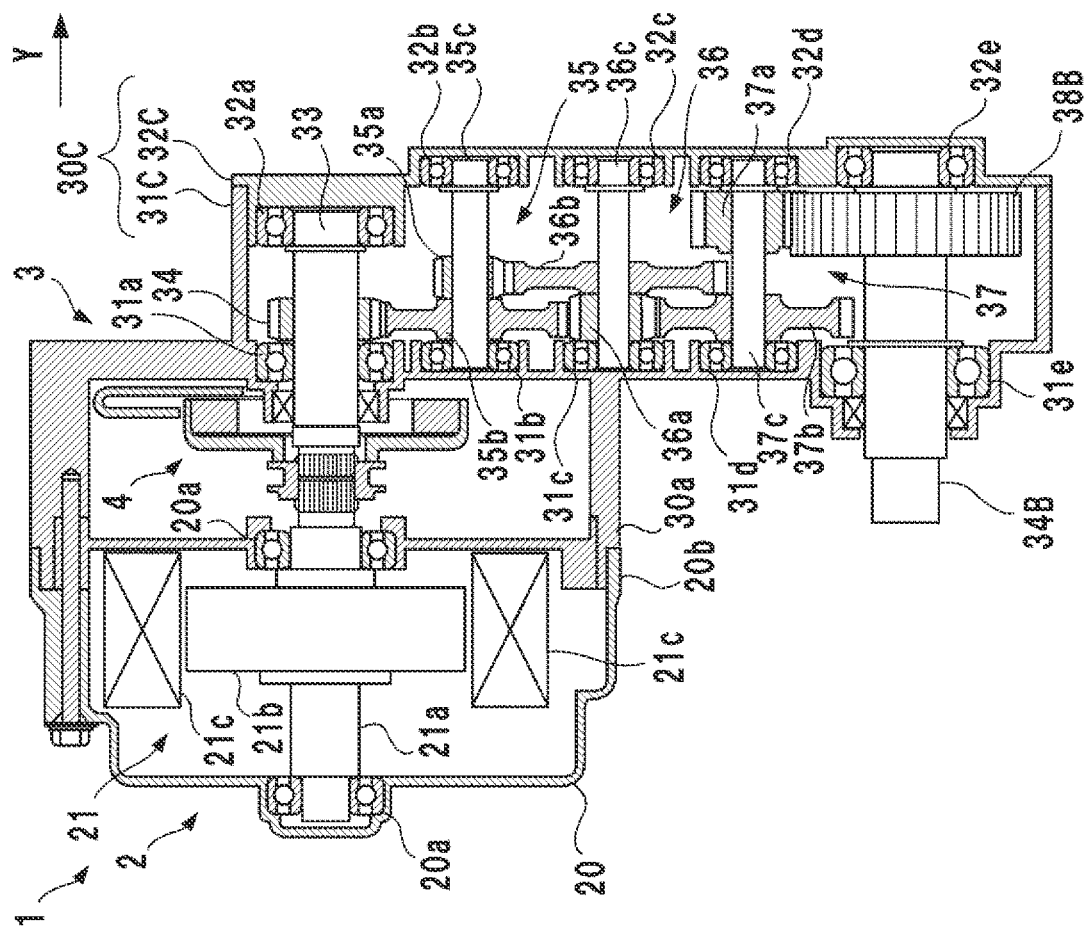
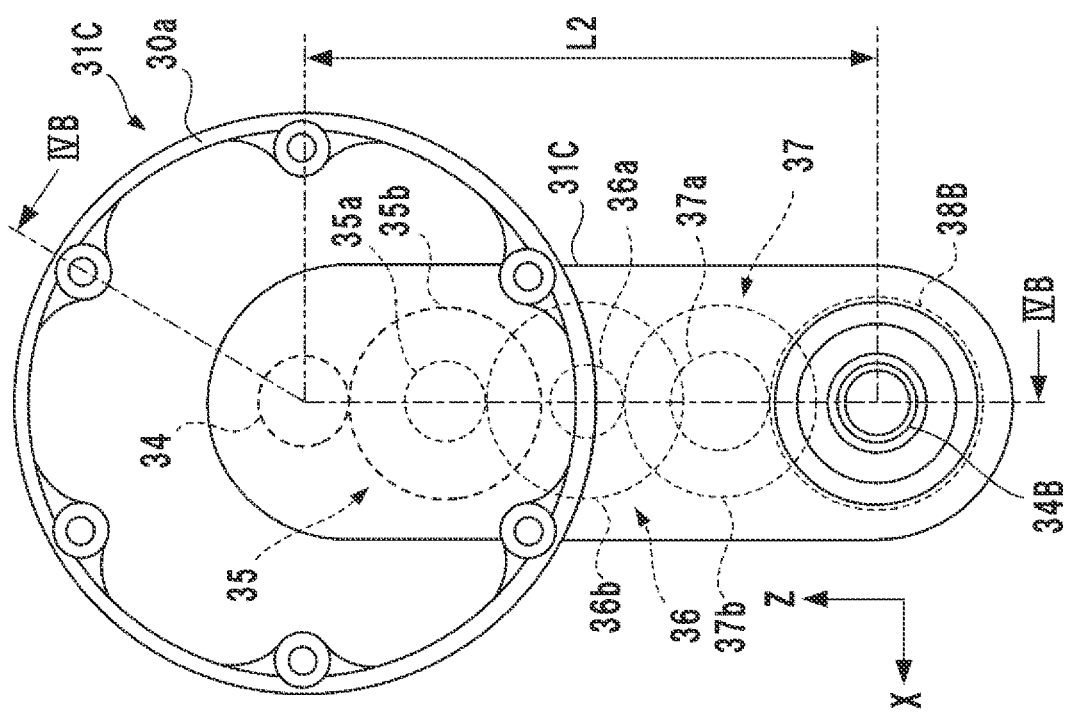

DRIVING DEVICE, COMPONENT SET, AND ASSEMBLY METHOD

CROSS-REFERENCE TO RELATED APPLICATION(S)

This application claims priority to and the benefit of Japanese Patent Application No. 2017-254258 filed on Dec. 28, 2017, the entire disclosure of which is incorporated herein by reference.

BACKGROUND OF THE INVENTION

Field of the Invention

The present invention relates to a driving device that includes a motor serving as a driving source.

Description of the Related Art

With the promotion of motorization of general vehicles, a structure in which a motor serves as a travelling driving source has also been proposed for working machines such as a lawn mower and a snow blower (Japanese Patent Laid-Open No. 2016-195484).

Some of the working machines employ crawlers as their travelling mechanism, and some of the working machines employ wheels. In addition, these working machines are different in size from one another. Since a driving device including a motor as a driving source can be made relatively small, the degree of freedom as to layout is high. However, if exclusive design is performed for each model including a speed reducer to be combined with a motor, it is disadvantageous in design efficiency and components management.

SUMMARY OF THE INVENTION

An object of the present invention is to improve the commonality of components among a plurality of models.

According to an aspect of the present invention, there is provided a driving device including: a motor unit including a motor; and a speed reducer attached to the motor unit, wherein the speed reducer includes: a plurality of gears combined to decelerate an output of the motor; and a gear case configured to support the plurality of gears and attached to the motor unit, the gear case is selected from a plurality of types of gear cases, and the plurality of types of gear cases are different from one another in an arrangement of the plurality of gears and a position of an output shaft relative to an input shaft.

According to another aspect of the present invention, there is provided a component set for a driving device including a motor unit and a speed reducer attached to the motor unit, comprising components constituting the motor unit, and components constituting the speed reducer, wherein the components constituting the motor unit includes a motor, the components constituting the speed reducer includes: a plurality of gears combined to decelerate an output of the motor; and a plurality of types of gear cases configured to support the plurality of gears and attached to the motor unit, and the plurality of types of gear cases are different from one another in an arrangement of the plurality of gears and a position of an output shaft relative to an input shaft.

The present invention also provides a method for assembling a speed reducer to be attached to a motor unit including a motor, the method including: selecting a gear case to be attached to the motor unit, from a plurality of types of gear cases; and incorporating a plurality of gears combined to decelerate an output of the motor, into the selected gear case, and attaching the selected gear case to the motor unit, wherein the plurality of types of gear cases are different from one another in an arrangement of the plurality of gears and a position of an output shaft relative to an input shaft.

Further features of the present invention will become apparent from the following description of exemplary embodiments (with reference to the attached drawings).

BRIEF DESCRIPTION OF THE DRAWINGS

FIG. 2A illustrates a gear arrangement in a speed reducer;

FIG. 2B is a sectional view taken along line IIB-IIB in FIG. 2A;

FIG. 3A illustrates a gear arrangement in the speed reducer including another gear case;

FIG. 3B is a sectional view taken along line IIIB-IIIB in FIG. 3A;

FIG. 4A illustrates a gear arrangement in the speed reducer including still another gear case;

FIG. 4B is a sectional view taken along line IVB-IVB in FIG. 4A; and

DESCRIPTION OF THE EMBODIMENTS

Figure 1:
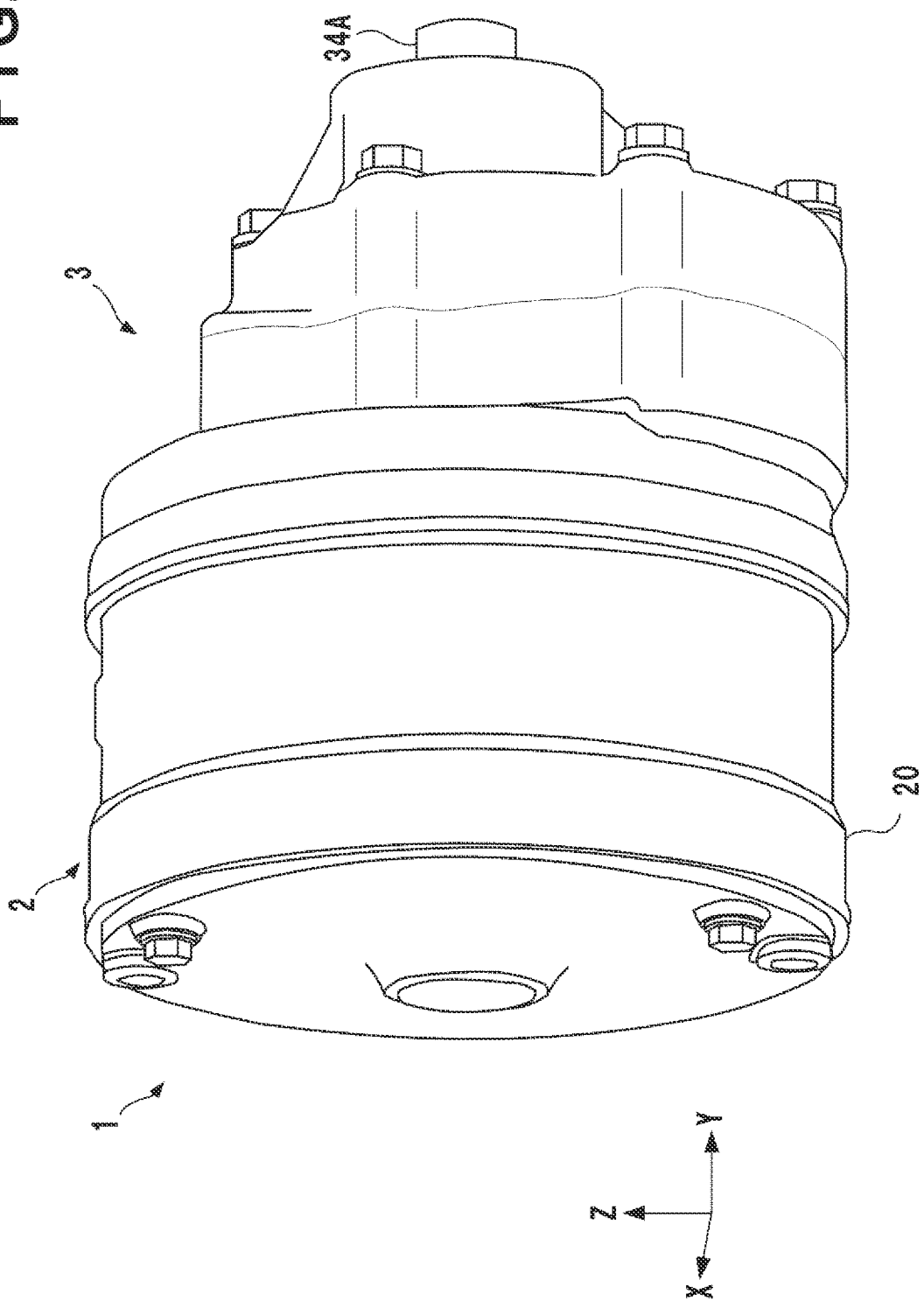
FIG. 1 is an external view of a driving device according to an embodiment of the present invention.

FIG. 1 is an external view of a driving device 1 according to the present invention. The driving device 1 has a cylindrical shape as a whole. In FIG. 1, an arrow Y indicates the axial direction of the driving device 1, and arrows X and Z indicate the radial directions of the driving device 1. The radial directions X and Z are orthogonal to each other. The driving device 1 is, for example, an electric unit that functions as a driving source for a traveling mechanism of a working machine. Examples of the working machine may include a lawn mower, a snow blower, an agricultural machine, and a construction working machine. The driving device 1 includes a motor unit 2 and a speed reducer 3. The speed reducer 3 includes an output shaft 34A. The speed reducer 3 decelerates a rotation output from the motor unit 2, and outputs the decelerated rotation from the output shaft 34A.

The speed reducer 3 is separably attached to the motor unit 2 by bolt fastening. FIG. 2A is a schematic view of the speed reducer 3 seen from a motor unit 2-side end face of the speed reducer 3. FIG. 2A illustrates an arrangement of an input gear 34, transmission gears 35 to 37, and an output gear 38A that are incorporated in the speed reducer 3. FIG. 2B is a sectional view of the driving device 1 taken along line I-I in FIG. 2A. The section taken along line IIB-IIB is bent for the sake of showing a relationship of mesh among the input gear 34, the transmission gears 35 to 37, and the output gear 38A. Apart of the sectional view of FIG. 2B illustrating the speed reducer 3 is in the form of a development view.

The motor unit 2 includes a cylindrical motor case 20 and a motor 21 incorporated in the motor case 20. The motor 21 is a brushless motor including a rotational shaft 21a, a rotor (permanent magnet) 21b provided on the rotational shaft 21a, and a stator 21c around which a coil is wound; however, other types of motors may also be employed. The axial direction of the rotational shaft 21a extends along the Y direction. The rotational shaft 21a is rotatably supported by a bearing 20a supported to the motor case 20.

The speed reducer 3 includes a gear case 30A. The gear case 30A includes a case main body 31A and a cover 32A fixed to each other by bolt fastening, and has formed therein a hollow for accommodating a mechanism. The case main body 31A has a connection portion 30a on its motor unit 2-side end. The connection portion 30a is fixed to a connection portion 20a of the motor case 20 by bolt fastening, so that the motor unit 2 and the speed reducer 3 are fixed to each other. Bearings 31a to 31d are supported to the case main body 31A, and bearings 32a to 32d are supported to the cover 32A.

The speed reducer 3 includes an input shaft 33 and the output shaft 34A. The input shaft 33 is arranged coaxially with the rotational shaft 21a, and is rotatably supported by the bearing 31a and a bearing 38a. The speed reducer 3 is provided with a clutch mechanism 4 that is capable of connecting and disconnecting the input shaft 33 to and from the rotational shaft 21a. When the clutch mechanism 4 connects the input shaft 33 to the rotational shaft 21a, the driving force (rotational force) of the rotational shaft 21a is transmitted to the input shaft 33. The output shaft 34A is arranged coaxially with the input shaft 33, and is supported by the bearing 32a.

The output gear 38A is integrally provided on the output shaft 34A. The output gear 38A is a spur gear in the present embodiment. The output gear 38A has on its end face a recess in which the bearing 38a is provided. The bearing 38a supports the input shaft 33 such that the input shaft 33 is rotatable. With this configuration, the input shaft 33 and the output shaft 34A are arranged coaxially with each other and are rotatable independently of each other by the bearings 31a, 32a, and 38a.

The input gear 34 is fixed to the input shaft 33. The input gear 34 is a spur gear in the present embodiment. The driving force of the input shaft 33 is transmitted from the input gear 34 to the output shaft 34A through the transmission gears 35 to 37 and the output gear 38A.

The transmission gears 35 to 37 are arranged to adjoin one another. In particular, the transmission gears 35 to 37 are annularly arranged in the circumferential direction of the input shaft 33 (i.e., around the rotational shaft 21a). By arranging the transmission gears 35 to 37 as described above, it is possible to achieve reductions in thickness and size of the speed reducer 3 in the axial direction (Y direction) and the radial direction (X direction or Z direction).

Each of the transmission gears 35 to 37 is a spur gear in the present embodiment. In particular, the transmission gears 35 to 37 are double gears respectively including small-diameter gears 35a to 37a and large-diameter gears 35b to 37b coaxially arranged.

The transmission gear 35 includes the small-diameter gear 35a, the large-diameter gear 35b larger in diameter than the small-diameter gear 35a, and a shaft 35c to which the small-diameter gear 35a and the large-diameter gear 35b are fixed. The axial direction of the shaft 35c extends along the Y direction. The shaft 35c is rotatably supported by the bearing 31b and the bearing 32b. The large-diameter gear 35b meshes with the input gear 34.

The transmission gear 36 includes the small-diameter gear 36a, the large-diameter gear 36b larger in diameter than the small-diameter gear 36a, and a shaft 36c to which the small-diameter gear 36a and the large-diameter gear 36b are fixed. The axial direction of the shaft 36c extends along the Y direction. The shaft 36c is rotatably supported by the bearing 31c and the bearing 32c. The large-diameter gear 36b meshes with the small-diameter gear 35a of the transmission gear 35.

The transmission gear 37 includes the small-diameter gear 37a, the large-diameter gear 37b larger in diameter than the small-diameter gear 37a, and a shaft 37c to which the small-diameter gear 37a and the large-diameter gear 37b are fixed. The axial direction of the shaft 37c extends along the Y direction. The shaft 37c is rotatably supported by the bearing 31d and the bearing 32d. The large-diameter gear 37b meshes with the small-diameter gear 36a of the transmission gear 36. The small-diameter gear 37a meshes with the output gear 38A.

The transmission gears 35 to 37 are arranged such that the small-diameter gears 35a to 37a and the large-diameter gears 35b to 37b are reversely arranged in the Y direction in adjoining two of the transmission gears 35 to 37. Specifically, in the transmission gear 35, the small-diameter gear 35a is disposed on the output shaft 34A side, and the large-diameter gear 35b is disposed on the motor unit 2 side. In the transmission gear 36 adjoining the transmission gear 35, the small-diameter gear 36a is disposed on the motor unit 2 side, and the large-diameter gear 36b is disposed on the output shaft 34A side. In the transmission gear 37 adjoining the transmission gear 36, the small-diameter gear 37a is disposed on the output shaft 34A side, and the large-diameter gear 37b is disposed on the motor unit 2 side. By alternately arranging the small-diameter gears 35a to 37a and the large-diameter gears 35b to 37b as described above, it is possible to achieve the reduction in thickness of the speed reducer 3 in the Y direction.

Figure 5A:
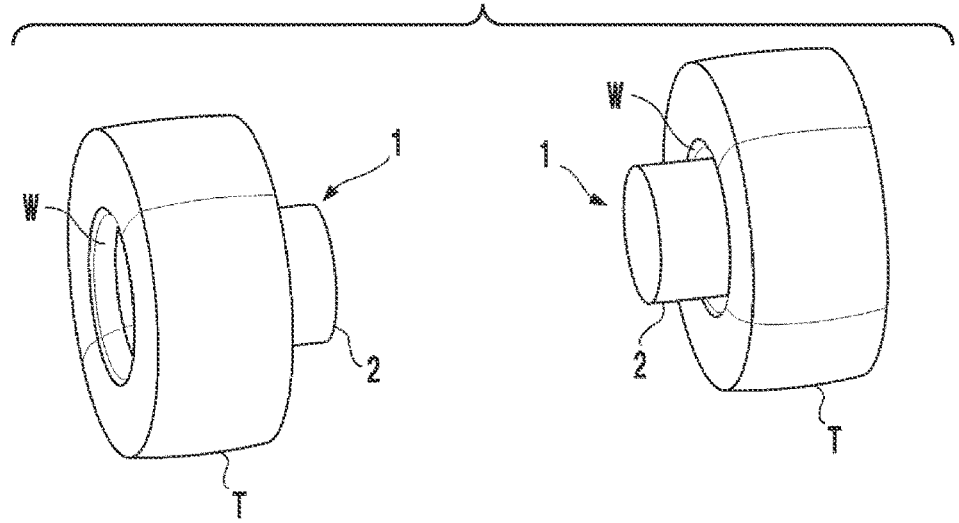
FIGS. 5A to 5C illustrate examples of use of driving devices that are different from one another in a gear case.

With the configuration described above, the driving force of the motor unit 2 can be output from the output shaft 34A that is arranged coaxially with the rotational shaft 21a and the input shaft 33. Since the driving device 1 is compact in the radial direction as a whole, the driving device 1 can be utilized as, for example, an in-wheel motor illustrated in FIG. 5A as an example of application to a traveling mechanism of a working machine. In the example illustrated in FIG. 5A, the driving device 1 is disposed so as to be inserted into a wheel W of a drive wheel including a tire T and the wheel W, and the output shaft 34A is fixed to the wheel W. By providing two sets of the driving devices 1 and the drive wheels, it is possible to construct a traveling mechanism including right and left drive wheels as illustrated in FIG. 5A.

Next, the driving device 1 according to the present embodiment is capable of constructing a driving device in which a layout of the output shaft 34A is changeable, by exchanging the gear case 30A while achieving the shared use of the motor unit 2. FIGS. 3A and 3B illustrate an example of a configuration employing a gear case 30B. In the following description, the configuration employing the gear case 30A is sometimes referred to as a coaxial form, and the configuration employing the gear case 30B is sometimes referred to as a non-coaxial form A.

FIG. 3A is a schematic view of the speed reducer 3 including the gear case 30B, the speed reducer 3 being seen from the motor unit 2-side end face of the speed reducer 3. FIG. 3A illustrates an arrangement of the input gear 34, the transmission gears 35 to 37, and an output gear 38B that are incorporated in the speed reducer 3. FIG. 3B is a sectional view of the driving device 1 taken along line IIIB-IIIB in FIG. 3A. As in FIG. 2B, the section taken along line IIIB-IIIB is bent for the sake of showing a relationship of mesh among the input gear 34, the transmission gears 35 to 37, and the output gear 38B. A part of the sectional view of FIG. 3B illustrating the speed reducer 3 is in the form of a development view.

The gear case 30B is different from the gear case 30A in a shape and the like, but is similar to the gear case 30A in a configuration. The gear case 30B includes a case main body 31B and a cover 32B fixed to each other by bolt fastening, and has formed therein a hollow for accommodating a mechanism. The case main body 31B has, on its motor unit 2-side end, a connection portion 30a that is the same as the connection portion 30a of the case main body 31A in the structure. The gear case 30A and the gear case 30B can share the motor unit 2 by unifying the structure of the connection portion 30a. Bearings 31a to 31e are supported to the case main body 31B, and bearings 32a to 32e are supported to the cover 32B. In the non-coaxial form A, the bearing 31e and the bearing 32e are additionally provided to the gear case 30A in the coaxial form.

The non-coaxial form A is different from the coaxial form in the output shaft 34B that is parallel to the rotational shaft 21a (or the input shaft 33) and is spaced apart from the rotational shaft 21a (or the input shaft 33) in the radial direction. Therefore, the non-coaxial form A employs the same input shaft 33 as that in the coaxial form, but is different from the coaxial form in a structure to support the input shaft 33. The input shaft 33 is arranged coaxially with the rotational shaft 21a, and is rotatably supported by the bearings 31a and 32a. The non-coaxial form A employs the same clutch mechanism 4 as that in the coaxial form. The clutch mechanism 4 can connect and disconnect the input shaft 33 to and from the rotational shaft 21a. The output shaft 34B is different from the output shaft 34A. The output shaft 34B is spaced apart from the input shaft 33, and is rotatably supported by the bearings 31e and 32e. The axial direction of the output shaft 34B extends along the Y direction, and is parallel to the input shaft 33. In FIG. 3A, L1 represents a distance between the input shaft 33 and the output shaft 34B.

The output gear 38B is fixed to the output shaft 34B. The output gear 38B is different from the output gear 38A in the coaxial form, and has no recess for accommodating the bearing. However, the output gear 38B is the same as the output gear 38A in the gear configuration. The output gear 38B is a spur gear, and is the same as the output gear 38A in the tooth pitch and the like.

The input gear 34 and the transmission gears 35 to 37 in the non-coaxial form A are the same as the input gear 34 and the transmission gears 35 to 37 in the coaxial form. The arrangement of the transmission gears 35 to 37 in the non-coaxial form A is similar to that in the coaxial form. Specifically, the transmission gears 35 to 37 are annularly arranged in the circumferential direction of the input shaft 33 (i.e., around the rotational shaft 21a). The alternate arrangement of the small-diameter gears 35a to 37a and the large-diameter gears 35b to 37b in the non-coaxial form A is also the same as that in the coaxial form. Since the non-coaxial form A is different from the coaxial form in the arrangement of the output shaft 34B, the non-coaxial form A is also different from the coaxial form in the arrangement of the output gear 38B. The central axes of the input gear 34, transmission gear 37, and output gear 38B are arranged in line in the Z direction.

Figure 5B:
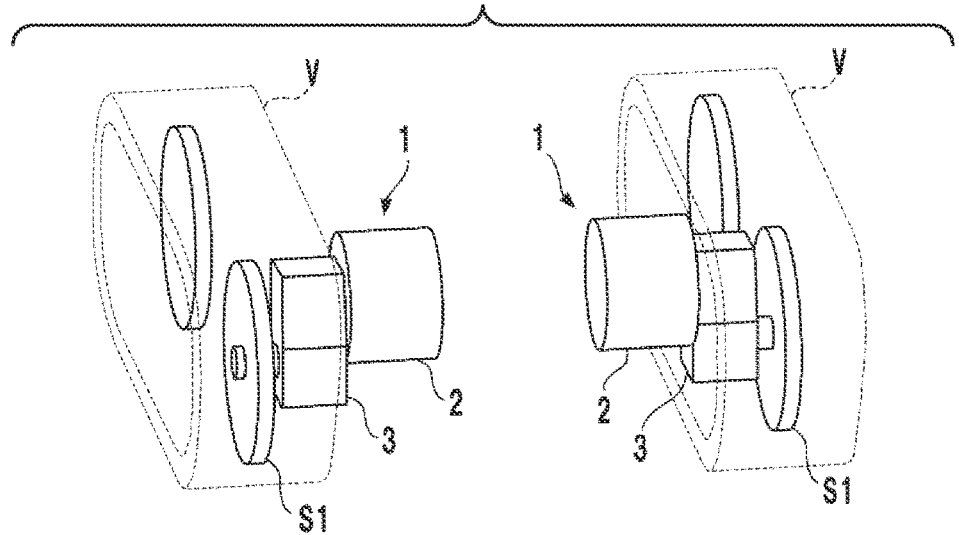

With the configuration described above, in the non-coaxial form A, the driving force of the motor unit 2 can be output from the output shaft 34B that is not arranged coaxially with the rotational shaft 21a and the input shaft 33. The driving device 1 employing the non-coaxial form A can be utilized as, for example, a driving source of a crawler illustrated in FIG. 5B as an example of application to a traveling mechanism of a working machine. In the example illustrated in FIG. 5B, the speed reducer 3 is disposed inside a crawler belt V, and a sprocket (drive tumbler) S1 is fixed to the output shaft 34B thereof. The motor unit 2 is disposed outside the crawler belt V. By providing two sets of the driving devices 1 employing the non-coaxial form A and the crawlers, it is possible to construct a traveling mechanism including left and right crawlers as illustrated in FIG. 5B.

Next, the driving device 1 including still another gear case will be described. FIGS. 4A and 4B illustrate an example of a configuration employing a gear case 30C. In the following description, the configuration employing the gear case 30C is sometimes referred to as a non-coaxial form B.

FIG. 4A is a schematic view of the speed reducer 3 including the gear case 30C, the speed reducer 3 being seen from the motor unit 2-side end face of the speed reducer 3. FIG. 4A illustrates an arrangement of the input gear 34, the transmission gears 35 to 37, and the output gear 38B that are incorporated in the speed reducer 3. FIG. 4B is a sectional view of the driving device 1 taken along line IVB-IVB in FIG. 4A.

The gear case 30C is different from the gear case 30A and the gear case 30B in a shape and the like, but is similar to the gear case 30A and the gear case 30B in a configuration. The gear case 30C includes a case main body 31C and a cover 32C fixed to each other by bolt fastening, and has formed therein a hollow for accommodating a mechanism. The case main body 31C has, on its motor unit 2-side end, a connection portion 30a that is the same as the connection portion 30a of the case main body 31A in the structure. The gear cases 30A to 30C can share the motor unit 2. The bearings 31a to 31 e are supported to the case main body 31C, and the bearings 32a to 32e are supported to the cover 32C. The non-coaxial form B is the same as the non-coaxial form A in the number of bearings.

Also in the non-coaxial form B, as in the non-coaxial form A, the output shaft 34B is parallel to the rotational shaft 21a (or the input shaft 33) and is spaced apart from the rotational shaft 21a (or the input shaft 33) in the radial direction. The non-coaxial form B employs the same input shaft 33 as that in the non-coaxial form A, and is the same as the non-coaxial form A in the structure to support the input shaft 33. The input shaft 33 is arranged coaxially with the rotational shaft 21a, and is rotatably supported by the bearings 31a and 32a. The non-coaxial form B employs the same clutch mechanism 4 as those in the coaxial form and non-coaxial form A. The clutch mechanism 4 can connect and disconnect the input shaft 33 to and from the rotational shaft 21a. The non-coaxial form B employs the same output shaft 34B as that in the non-coaxial form A. The output shaft 34B is spaced apart from the input shaft 33, and is rotatably supported by the bearings 31e and 32e. The axial direction of the output shaft 34B extends along the Y direction, and is parallel to the input shaft 33.

The non-coaxial form B is different from the non-coaxial form A in a position of the output shaft 34B. A distance L2 between the input shaft 33 and the output shaft 34B is larger than the distance L1. In addition, the orientation of the output shaft 34B in the non-coaxial form B is opposite in direction to the orientation of the output shaft 34B in the non-coaxial form A. That is, in the non-coaxial form A, the output shaft 34B protrudes to the side opposite to the motor unit 2 side. On the other hand, in the non-coaxial form B, the output shaft 34B protrudes to the motor unit 2 side.

The same output gear 38B as that in the non-coaxial form A is fixed to the output shaft 34B. The input gear 34 and the transmission gears 35 to 37 in the non-coaxial form B are the same as the input gear 34 and the transmission gears 35 to 37 in each of the coaxial form and the non-coaxial form A. However, the non-coaxial form B is different from the non-coaxial form A in an arrangement of the transmission gears 35 to 37. The shafts 35c to 37c of the transmission gears 35 to 37 are arranged in line in the Z direction. In addition, the input gear 34 and the output gear 38B are also arranged in line. That is, the central axes of the input gear 34, transmission gears 35 to 37, and output gear 38B are arranged in line in the Z direction.

Figure 5C:
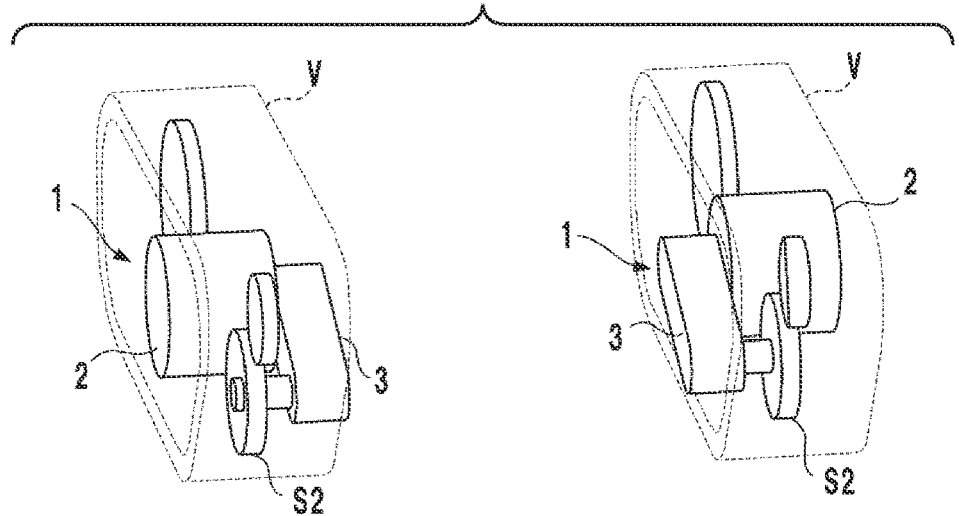

With the configuration described above, in the non-coaxial form B, the driving force of the motor unit 2 can be output from the output shaft 34B that is not arranged coaxially with the rotational shaft 21a and the input shaft 33. The driving device 1 employing the non-coaxial form B can be utilized as, for example, a driving source of a crawler illustrated in FIG. 5C as an example of application to a traveling mechanism of a working machine. In the example illustrated in FIG. 5C, the speed reducer 3 is disposed inside a crawler belt V, and a sprocket (sprocket wheel) S2 is fixed to the output shaft 34B thereof. Since the output shaft 34B protrudes to the motor unit 2 side, the motor unit 2 is also disposed inside the crawler belt V Furthermore, since the distance L2 can be secured to be relatively long, the motor unit 2 can be disposed at the center of the crawler belt V in the traveling direction while the output shaft 34B is disposed at the end of the crawler belt V in the traveling direction. As a result, the barycentric position of the crawler is easily set to the center side. By providing two sets of the driving devices 1 employing the non-coaxial form B and the crawlers, it is possible to construct a traveling mechanism including left and right crawlers as illustrated in FIG. 5C. Since the motor unit 2 can also be disposed inside the crawler belt V, an arrangement space for the motor unit 2 is not necessarily secured on a vehicle body, so that the degree of freedom as to a layout on the vehicle body side is improved.

As described above, in the present embodiment, it is possible to obtain the driving device 1 in which the position (coaxial, non-coaxial, orientation) of the output shaft 34A or 34B relative to the input shaft 33 is changeable, by selecting one of the plurality of types of gear cases 30A to 30C for the common motor unit 2. Although the driving device 1 in which the layout is changeable can be obtained, the commonality of components can be improved since the transmission gears 35 to 37 can be used in common in addition to the motor unit 2. Furthermore, the input shaft 33 and the input gear 34 can also be used in common in the present embodiment. In addition, the output shaft 34B and the output gear 38B can also be used in common in the non-coaxial form A and the non-coaxial form B.

In components management for the driving device 1, it is convenient to stock the motor unit 2, the plurality of types of gear cases 30A to 30C, the respective gears, and the like as a component set. In this example, when the form of the driving device 1 is selected from those illustrated in FIGS. 5A to 5C in accordance with an order received from a consumer, it is possible to immediately shift to assembly of a driving device 1 in an appropriate form by selecting the corresponding gear case from the plurality of types of gear cases 30A to 30C. The assembly method may involve selecting the gear case, incorporating the gears and the like into the gear case to assemble the speed reducer 3, and attaching the speed reducer 3 to the motor unit 2. In this manner, the driving device 1 can be completed quickly.

OTHER EMBODIMENTS

The foregoing embodiment employs three types of gear cases. Alternatively, two types of gear cases may be employed. Still alternatively, four or more types of gear cases may be employed.

The components to be used in common may be all components other than the gear case or may be some of the components as described in the foregoing embodiment. As to the gears, all the gears constituting the speed reducer 3 may be used in common, or some of the gears may be used in common. All the transmission gears 35 to 37 may be used in common, or some of the transmission gears 35 to 37 are not necessarily used in common. The number of transmission gears may be three as described in the foregoing embodiment. Alternatively, the number of transmission gears may be two or may be four or more. Each gear is not limited to a spur gear, and may be of another type.

Only the orientation of the output shaft (34A, 34B) may differ depending on the type of the gear case. In addition to the non-coaxial forms A and B that are opposite in orientation of the output shaft to each other in the same axial direction, the types of the gear cases may be different from one another in orientations of output shafts that are orthogonal to one another.

SUMMARY OF EMBODIMENT

1. A driving device according to the foregoing embodiment is a driving device (1) including: a motor unit (2) including a motor (21); and a speed reducer (3) attached to the motor unit, wherein the speed reducer includes: a plurality of gears (35 to 37) combined to decelerate an output of the motor; and a gear case configured to support the plurality of gears and attached to the motor unit, the gear case is selected from a plurality of types of gear cases (30A to 30C), and the plurality of types of gear cases are different from one another in an arrangement of the plurality of gears and a position of an output shaft (34A, 34B) relative to an input shaft (33).

According to this embodiment, it is possible to construct a driving mechanism in which a layout is changeable, by changing the gear cases. It is also possible to achieve shared use of the motor unit and the plurality of gears and to improve the commonality of the components.

2. In the foregoing embodiment, the plurality of types of gear cases include at least: a first gear case (30A) in which a rotational shaft (21a) of the motor and the output shaft are coaxially positioned; and a second gear case (30B, 30C) in which the rotational shaft of the motor and the output shaft are parallel to each other and are spaced apart from each other in a radial direction.

According to this embodiment, it is possible to construct a driving mechanism in which a layout of the output shaft is changeable, by changing the gear cases while achieving shared use of the components.

3. In the foregoing embodiment, the plurality of types of gear cases include at least: a first gear case (30A) in which a rotational shaft of the motor and the output shaft are coaxially positioned; a second gear case (30B) in which the rotational shaft of the motor and the output shaft are parallel to each other and are spaced apart from each other by a first distance (L1) in a radial direction; and a third gear case (30C) in which the rotational shaft of the motor and the output shaft are parallel to each other and are spaced apart from each other by a second distance (L2) different from the first distance, in the radial direction.

According to this embodiment, it is possible to construct a driving mechanism in which a layout of the output shaft is changeable, by changing the gear cases while achieving shared use of the components.

4. In the foregoing embodiment, the plurality of gears include a plurality of spur gears (35 to 37) arranged to adjoin one another, the plurality of spur gears are spur gears each including a small-diameter gear (35a to 37a) and a large-diameter gear (35b to 37b) coaxially provided, and the plurality of spur gears are arranged such that the small-diameter gears and the large-diameter gears are reversely arranged in an axial direction in adjoining two of the spur gears.

According to this embodiment, it is possible to achieve a reduction in thickness of the speed reducer and to reduce a space to be occupied by the driving device.

5. In the foregoing embodiment, the plurality of gears are spur gears (35 to 37), and the plurality of types of gear cases include: a first gear case (30A) in which a plurality of gears among the plurality of gears are arranged around a rotational shaft of the motor; and a second gear case (30C) in which shafts of the plurality of gears are arranged in line.

According to this embodiment, it is possible to obtain a driving device in which a radial size of the speed reducer is changeable, by changing the gear cases while achieving a reduction in thickness of the speed reducer in the direction of the rotational shaft.

6. In the foregoing embodiment, the plurality of gears are spur gears (35 to 37), and the plurality of types of gear cases include: a first gear case (30A) in which one of the plurality of gears is arranged coaxially with a rotational shaft of the motor, and the other gears are arranged around the rotational shaft; a second gear case (30C) in which shafts of the plurality of gears are arranged in line; and a third gear case (30B) in which one of the plurality of gears is spaced apart from the rotational shaft of the motor, and the other gears are arranged around the rotational shaft.

According to this embodiment, it is possible to obtain a driving device in which a layout of the output shaft is changeable, by changing the gear cases while achieving a reduction in thickness of the speed reducer.

7. A component set according to the foregoing embodiment is a component set for a driving device (1) including a motor unit (2) and a speed reducer (3) attached to the motor unit, wherein a component constituting the motor unit includes a motor (21), a component constituting the speed reducer includes: a plurality of gears (35 to 37) combined to decelerate an output of the motor; and a plurality of types of gear cases (30A to 30C) configured to support the plurality of gears and attached to the motor unit, and the plurality of types of gear cases are different from one another in an arrangement of the plurality of gears and a position of an output shaft (38A, 38B) relative to an input shaft (33).

According to this embodiment, it is also possible to construct a driving mechanism in which a layout is changeable, by changing the gear cases. It is also possible to achieve shared use of the motor unit and the plurality of gears and to improve the commonality of the components.

8. An assembly method according to the foregoing embodiment is a method for assembling a speed reducer (3) to be attached to a motor unit (2) including a motor (21), the method including: selecting a gear case to be attached to the motor unit, from a plurality of types of gear cases (30A to 30C); and incorporating a plurality of gears (35 to 37) combined to decelerate an output of the motor, into the selected gear case, and attaching the selected gear case to the motor unit (2), wherein the plurality of types of gear cases are different from one another in an arrangement of the plurality of gears and a position of an output shaft (38A, 38B) relative to an input shaft (33).

According to this embodiment, it is also possible to construct a driving mechanism in which a layout is changeable, by changing the gear cases. It is also possible to achieve shared use of the motor unit and the plurality of gears and to improve the commonality of the components.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method for assembling driving devices, the method comprising:
   providing a motor unit, a first speed reducer configured to be attached to the motor unit, a second speed reducer configured to be attached to the motor unit, and a third speed reducer configured to be attached to the motor unit,
   assembling a driving device by attaching the motor unit to one of the first, second, and third speed reducers
   wherein
   the motor unit includes a motor having a rotational shaft,
   each of the first, second, and third speed reducer includes a plurality of gears combined to decelerate an output of the motor of the motor unit and an output shaft,
   the first speed reducer includes a first gear case configured to be attached to the motor unit and supporting the plurality of gears of the first speed reducer,
   the second speed reducer includes a second gear case configured to be attached to the motor unit and supporting the plurality of gears of the second speed reducer,
   the third speed reducer includes a third gear case configured to be attached to the motor unit and supporting the plurality of gears of the third speed reducer,
   for the attachment of one gear case among the first to third gear cases to the motor unit, the rotational shaft of the motor and the output shaft are coaxially positioned,
   for the attachment of another gear case among the first to third gear cases to the motor unit, the rotational shaft of the motor and the output shaft are parallel to each other and are spaced apart from each other by a first distance in a radial direction, and
   for the attachment of the other gear case among the first to third gear cases to the motor unit, the rotational shaft of the motor and the output shaft are parallel to each other and are spaced apart from each other by a second distance different from the first distance, in a radial direction.

2. The method according to claim 1, wherein the motor unit includes a connection portion,
   the first gear case includes a first connection portion, which is configured to be fixed to the connection portion of the motor unit, on its end,
   the second gear case includes a second connection portion, which is configured to be fixed to the connection portion of the motor unit, on its end, the third gear case includes a third connection portion, which is configured to be fixed to the connection portion of the motor unit, on its end, and each of the first connection portion, the second connection portion, and the third connection portion includes the same structure.

3. The method according to claim 1, wherein the plurality of gears include a plurality of spur gears arranged to adjoin one another, each of the plurality of spur gears including a small-diameter gear and a large-diameter gear coaxially provided, and the plurality of spur gears are arranged such that the small-diameter gears and the large-diameter gears are reversely arranged in an axial direction in adjoining two of the spur gears.

4. The method according to claim 1, wherein the plurality of gears are spur gears, in the first gear case, a plurality of gears among the plurality of gears are arranged around a rotational shaft of the motor, and in each of the second gear case and the third gear case, shafts of the plurality of gears are arranged in line.

5. The method according to claim 1, wherein the plurality of gears are spur gears, in the first gear case, one of the plurality of gears is arranged coaxially with a rotational shaft of the motor, and the other gears are arranged around the rotational shaft, in the third gear case, shafts of the plurality of gears are arranged in line, and in the second gear case, one of the plurality of gears is spaced apart from the rotational shaft of the motor, and the other gears are arranged around the rotational shaft.

* * * * *